(No Model.) 2 Sheets—Sheet 2.
C. W. CHANCELLOR.
SEPARATING AND FILTRATING APPARATUS FOR SEWAGE.
No. 372,656. Patented Nov. 8, 1887.
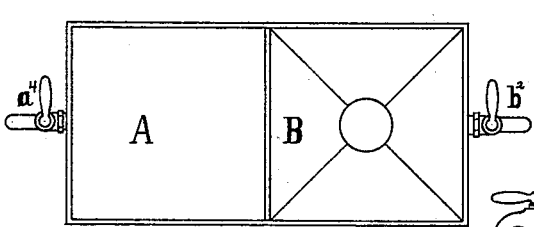
FIG 5
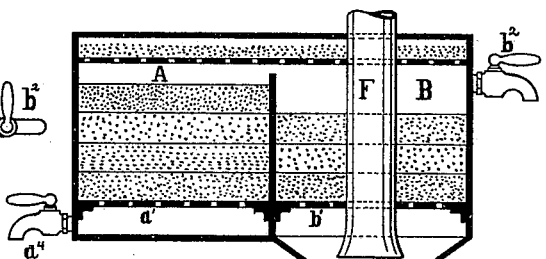
FIG 6
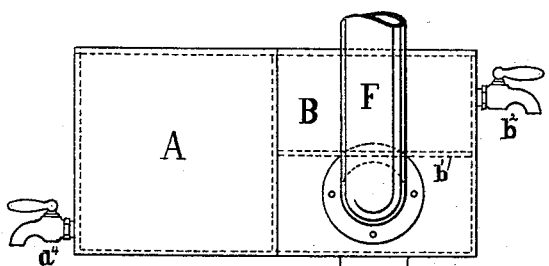
FIG 7
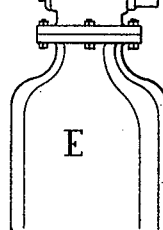
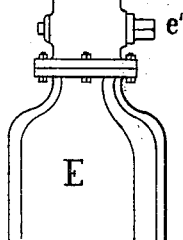
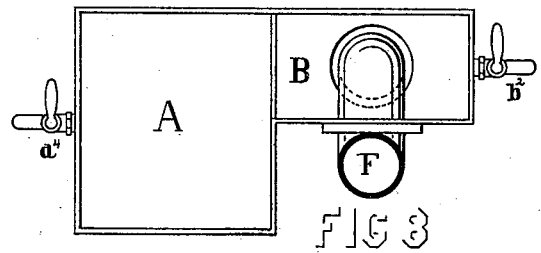
FIG 8
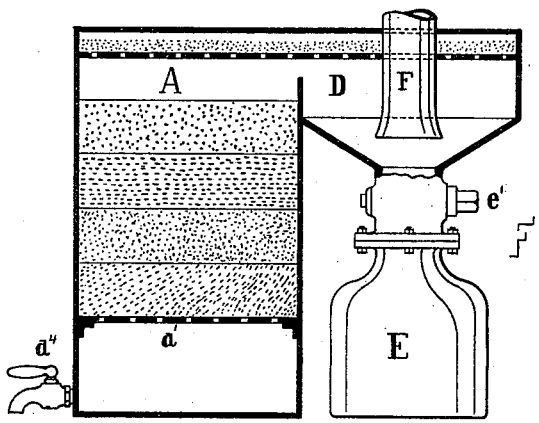
FIG 4
WITNESSES:
A. S. Barroll
Edgar G. Miller, Jr.
INVENTOR
Charles W. Chancellor

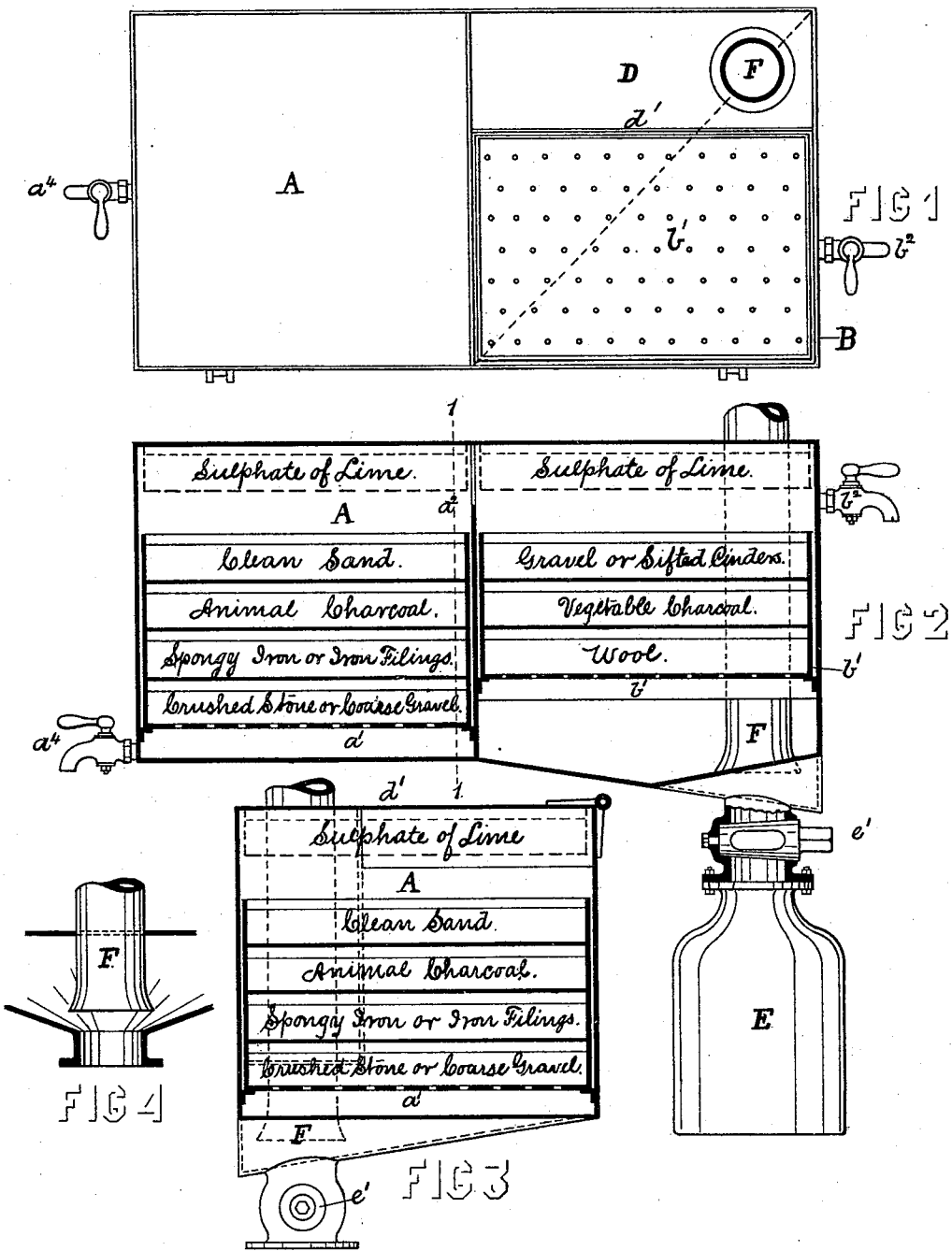

UNITED STATES PATENT OFFICE.

CHARLES W. CHANCELLOR, OF BALTIMORE, MARYLAND.

SEPARATING AND FILTRATING APPARATUS FOR SEWAGE.

SPECIFICATION forming part of Letters Patent No. 372,656, dated November 8, 1887.

Application filed May 19, 1887. Serial No. 238,736. (No model.)

*To all whom it may concern:*

Be it known that I, CHARLES W. CHANCELLOR, of Baltimore city, in the State of Maryland, have invented a new and useful Separating and Filtrating Apparatus for Sewage, especially adapted for household sewage, of which the following is a specification.

The accompanying drawings illustrate the invention, of which—

Figure 1 is a plan view showing the compartments into which the device is divided, the perforated plate at the bottom of one of the compartments, the opening for the drain-pipe for the solid matter in another, and the overflow-compartment. Fig. 2 is a sectional view of the apparatus, showing the layers of filtering material as they are arranged over the perforated plate, and also those in the overflow-compartment, the inclined base of one of the compartments, and the receiver for solid matter below the drain-pipe, and discharge-cocks for the discharge of liquid when filtrated. Fig. 3 is a section of the device taken on line 1 1 of Fig. 1. Fig. 4 shows a form of construction of the bottom of the device, with the drain-pipe located centrally over the outlet. Fig. 5 is a plan view of an apparatus having but two compartments, with the covers off, and showing the aperture leading to the receiver located centrally of one of the compartments; Fig. 6, a sectional view of the compartments, arranged as in Fig. 5, and showing elevations of the drain-pipe and receiver, the pipe passing down through the filtering material; Fig. 7, a side view of the apparatus, showing the drain-pipe on the outside of the box and leading into it below the filtering material; Fig. 8, a plan view of the device as illustrated in Fig. 7; Fig. 9, a modified form of the device, illustrating a compact construction for use where space is matter of moment.

The device may be constructed of any suitable material and of any convenient form. In the drawings it is shown rectangular, and, as shown, is divided into three compartments. A is the largest of the three, and, for convenience of illustration, is shown to occupy about one-half of the entire box. The other two compartments occupy the remaining half of the box, of which B is the larger and D the smaller of the two. These proportions may, however, be varied as desired. Elevated slightly above the bottom of the compartment B is placed a wire sieve or perforated plate, $b'$, of an area equal to the compartment, but not extending beyond into compartment D, and upon this plate or screen is placed a layer of wool, above the wool a layer of vegetable charcoal, and above the charcoal a layer of gravel or sifted cinders, and, as will be seen from the drawings, they form beds of filtrating material, which may, if desired, be separated from each other by sieves, perforated plates, or porous material of any kind. In the compartment A, I also place a perforated plate, as $a'$, so as to leave a space between it and the bottom of the compartment to receive the filtered liquid. This plate supports, first, a layer of crushed stone or gravel, and above this a layer of spongy iron or iron filings, above this a layer of animal charcoal, and on top of all a layer of clean sand. The bottom of the compartment D is inclined from two or more sides, so as to form a drain to direct all solid matter into the outlet below, as shown in Fig. 2; or it may be made to incline toward the center, as shown in Figs. 4, 5, and 6. To this opening is attached the receiver E in any suitable manner, so as to be removable as desired, and between the receiver and the bottom of compartment B a valve or cock, $e'$, to close off communication when the receiver is removed. At other times it remains open. The drain-pipe F passes down into the compartment D, its lower end reaching nearly to the bottom, and over the mouth of the outlet into the receiver. The compartment D should be provided with an air-tight cover, through which the drain-pipe should pass, and be suitably sealed to prevent the escape of gases or odor. The partition $a^2$, which separates the compartment A from the others, runs up to the top of the box at that part which separates compartment A from compartment D; but between compartments A and B it is somewhat lower, to allow a free overflow of liquid from B into A. The partition $d'$ also runs to the top, so that compartment D is entirely separated from both of the others. The compartment D and receiver E are filled with water when the apparatus is ready for work. The compartment D may be dispensed with, and the apparatus constructed as shown in Figs. 7 and 8, with the drain-pipe leading into the compartment B from the outside, below the filtering-beds, and extending to the center, so that its mouth may open into the receiver E, or like that shown in Figs. 5 and 6, where the drain-pipe extends down directly through the compartment B and through the layers of filtrating material, or as shown in Fig. 9, wherein the compartment B is dispensed with.

Its operation is as follows: The excreta, passing down through the drain-pipe F, composed of solid and liquid matter, passes out of said pipe over the opening into the receiver E. The solid matter falls to the bottom of the receiver and displaces thereby its bulk of water. The liquid matter remains in suspension in the water. The only outlet for the liquid is through the filtering material, above described. Thus, as shown in Figs. 1, 2, 3, and 4, the liquid finds its way under the perforated plate $b'$, and in seeking its level is forced by pressure in the soil-pipe and displacement of liquids by the solids in the receiver up through the perforations in the plate, through the wool, charcoal, or gravel in the compartment B, thence overflows into compartment A, and by gravity passes down through the filtrating material in that compartment and finds its way through the outlet $a^4$. In its passage the liquid is acted upon chemically—for example, the wool acts mechanically by engaging matter suspended in the liquid, the charcoal mechanically by engaging suspended matter which has passed through the wool, and also chemically in deodorizing the liquid, and as all the parts of the device are closely sealed no odor or gases can escape.

An apparatus constructed as shown and described, having all the beds or layers of filtrating material, is the best form in which it can be constructed and the most perfect in its results. The filtered liquid passing through the outlet $a^4$ is without smell, possesses no deleterious quality, and may be run into the street-gutter without doing injury or giving offense; but it will be seen that the apparatus need not have all nor, indeed, the greater portion of the filtrating-beds, as shown, nor all of the compartments described. For example, it is entirely practicable to dispense with the compartment A and allow compartment B to overflow through the outlet $b^2$. In such case an excellent filtrating apparatus could be made in which one, two, or more of the filtrating-beds might be selected for use; or the compartment B may be dispensed with, allowing the liquid matter to overflow direct from the compartment D into A, as shown in Fig. 9; or the compartment D may be dispensed with, as shown in Figs. 5, 6, 7, and 8.

This apparatus is especially adapted for household sewage, and may be used with or without a water-supply. When the receiver E has become filled with solid matter, it may be removed by closing the communication between it and the compartment D, while the solid matter contained therein may be utilized as a fertilizing agent or cremated, as desired, and as the solid matter bears a small proportion to the liquid matter a small receiver may be used a long time before it is filled, and while it is removed another may take its place.

In addition to the filtrating-beds, the apparatus may be provided with a grated or perforated floor above the top of the overflow-partition, and this floor, supplied with sulphate of lime or other chemical agent, would suppress all volatile properties—such as ammonia—which might possibly rise to the surface and find its way through a defective joint.

What I claim is—

1. The above-described process of separating, filtrating, and disposing of household sewage, which consists in discharging the solid and liquid matters of said sewage under a column or bed of water, separating one from the other by allowing the solid matter to drop by gravitation into a receiver, so as to displace an equal volume of water, then passing the diluted liquid matter and water displaced by the solid matter through suitable filters until it becomes innocuous, then discharging the liquid matter in an innocuous condition, then cutting off the water from the solid matter, and finally removing the solid matter, substantially as set forth.

2. A separating and filtration sewage apparatus consisting of a covered water-tight vessel provided with layers of filtering material, and a receiver for the solid matter located below the vessel and removably connected therewith, in combination with a soil-pipe passing into the vessel and having its discharging end submerged in water and located below the filtering material and above the receiver for the solid matter, and an outlet through the filtering material for the liquid matter, substantially as set forth.

3. A separating and filtration sewage apparatus consisting of a covered water-tight vessel provided with layers of filtering material and an outlet through said material for the liquid matter, and a receiver for the solid matter located below the vessel and removably connected therewith, in combination with a soil-pipe passing into the vessel and having its discharging end submerged in water and located in position to discharge its contents below the filtering material and to drop the solid matter into the receiver, and a valve or cock between the receiver and the upper part of the vessel, substantially as described.

4. A separating and filtration sewage apparatus consisting of a covered water-tight vessel provided with layers of filtering material and an outlet through said material for the liquid matter, and having a bed of sulphate of lime or other deodorizing material, in combination with a receiver for the solid matter located below the vessel and removably connected therewith, and a soil-pipe passing into the vessel and having its discharge end submerged in water and located in position to discharge its contents, so that the solid matter will drop by gravitation into the receiver and the liquid matter find its way through the filtering material, substantially as set forth.

CHARLES W. CHANCELLOR.

Witnesses:
A. S. BANOLL,
EDGAR G. MILLER, Jr.,
FELIX R. SULLIVAN.